(12) United States Patent
Hann

(10) Patent No.: US 8,168,071 B2
(45) Date of Patent: May 1, 2012

(54) PROCESS AND APPARATUS FOR TREATING A HEAVY HYDROCARBON FEEDSTOCK

(75) Inventor: Thomas Charles Hann, Onoway (CA)

(73) Assignee: Suncor Energy Inc., Calgary, Alberta (CA)

(*) Notice: Subject to any disclaimer, the term of this patent is extended or adjusted under 35 U.S.C. 154(b) by 725 days.

(21) Appl. No.: 12/277,261

(22) Filed: Nov. 24, 2008

(65) Prior Publication Data

US 2009/0134095 A1 May 28, 2009

Related U.S. Application Data

(63) Continuation-in-part of application No. 11/938,226, filed on Nov. 9, 2007, which is a continuation-in-part of application No. 11/595,817, filed on Nov. 9, 2006.

(30) Foreign Application Priority Data

Nov. 7, 2008 (CA) ..................................... 2643472

(51) Int. Cl.
  *B01D 17/028* (2006.01)
  *B01D 19/00* (2006.01)
  *B01D 21/02* (2006.01)
(52) U.S. Cl. ........ 210/741; 210/801; 210/802; 210/803; 210/120; 210/188; 210/519; 210/521; 210/522; 210/532.1; 210/533; 210/536
(58) Field of Classification Search .................. 210/741, 210/801, 802, 803, 120, 188, 519, 521, 522, 210/532.1, 533, 536
See application file for complete search history.

(56) References Cited

U.S. PATENT DOCUMENTS 1,431,367 A 10/1922 Buchi ......................... 210/532.1
(Continued)

FOREIGN PATENT DOCUMENTS

CA 518320 11/1955
(Continued)

OTHER PUBLICATIONS

Definition of "lateral", Merriam-Webster Online Dictionary, Accessed Mar. 10, 2011, pp. 1-3.
(Continued)

*Primary Examiner* — David A Reifsnyder
(74) *Attorney, Agent, or Firm* — Knobbe, Martens, Olson & Bear, LLP

(57) ABSTRACT

An apparatus and process for treating a heavy hydrocarbon feedstock having a specific gravity differential between components of the feedstock is disclosed. The apparatus includes a treatment vessel having an inlet for receiving the feedstock. The apparatus also includes a primary separation container located in the treatment vessel, the primary separation container being operable to accumulate feedstock to cause a low specific gravity portion of the feedstock to separate and rise to an upper surface of the accumulated feedstock. The apparatus also includes a first weir for collecting the low specific gravity portion from the surface of the accumulated feedstock in the primary separation container. The apparatus further includes a first outlet in the primary separation container, the first outlet being operably configured to receive settling solids in the accumulated feedstock and to produce a first discharge stream at the first outlet. The apparatus also includes a secondary separation container located in the treatment vessel to receive the collected low specific gravity portion, the secondary separation container being operable to accumulate the collected low specific gravity portion to cause hydrocarbon products to separate and rise to an upper surface of the accumulated low specific gravity portion of the feedstock. The apparatus further includes a product outlet for collecting the hydrocarbon products from the upper surface of the accumulated low specific gravity portion to produce a hydrocarbon product stream at the product outlet.

54 Claims, 4 Drawing Sheets

U.S. PATENT DOCUMENTS

| | | | |
|---|---|---|---|
| 2,910,424 A | 10/1959 | Tek et al. | |
| 3,419,145 A | 12/1968 | Celis | 210/84 |
| 3,607,720 A | 9/1971 | Paulson | |
| 3,808,120 A | 4/1974 | Smith | |
| 3,956,417 A | 5/1976 | Franz et al. | |
| 3,962,070 A | 6/1976 | Stotler | |
| 3,971,718 A | 7/1976 | Reid | |
| 3,972,861 A | 8/1976 | Gardner, Jr. et al. | |
| 4,017,263 A | 4/1977 | Holmes et al. | |
| 4,035,282 A | 7/1977 | Stuchberry et al. | |
| 4,036,664 A | 7/1977 | Priebe | |
| 4,072,609 A | 2/1978 | Kizior | |
| 4,090,943 A | 5/1978 | Moll et al. | |
| 4,139,646 A | 2/1979 | Gastrock | |
| 4,146,534 A | 3/1979 | Armstrong | |
| 4,216,085 A | 8/1980 | Chittenden | 210/703 |
| 4,216,796 A | 8/1980 | Gastrock | |
| 4,279,743 A | 7/1981 | Miller | |
| 4,337,143 A | 6/1982 | Hanson et al. | |
| 4,383,914 A | 5/1983 | Kizior | |
| 4,397,741 A | 8/1983 | Miller | |
| 4,399,027 A | 8/1983 | Miller | |
| 4,514,305 A | 4/1985 | Filby | |
| 4,545,892 A | 10/1985 | Cymbalisty et al. | |
| 4,556,422 A | 12/1985 | Reynolds et al. | |
| 4,581,142 A | 4/1986 | Fladby et al. | |
| 4,604,988 A | 8/1986 | Rao | |
| 4,744,890 A | 5/1988 | Miller et al. | |
| 4,838,434 A | 6/1989 | Miller et al. | |
| 4,851,123 A | 7/1989 | Mishra | |
| 4,859,317 A | 8/1989 | Shelfantook et al. | |
| 4,914,017 A | 4/1990 | Mifune | |
| 4,994,097 A | 2/1991 | Brouwers | |
| 5,032,275 A | 7/1991 | Thew | |
| 5,035,910 A | 7/1991 | Jones | |
| 5,037,558 A | 8/1991 | Kalnins | |
| 5,055,202 A | 10/1991 | Carroll et al. | |
| 5,062,955 A | 11/1991 | Sciamanna | |
| 5,066,407 A | 11/1991 | Furlow | 210/744 |
| 5,071,556 A | 12/1991 | Kalnins et al. | |
| 5,071,557 A | 12/1991 | Schubert et al. | |
| 5,073,177 A | 12/1991 | Brouwers | |
| 5,090,498 A | 2/1992 | Hamill | |
| 5,110,471 A | 5/1992 | Kalnins | |
| 5,118,408 A | 6/1992 | Jansen et al. | |
| 5,143,598 A | 9/1992 | Graham et al. | |
| 5,207,805 A | 5/1993 | Kalen et al. | |
| 5,223,148 A | 6/1993 | Tipman et al. | |
| 5,242,580 A | 9/1993 | Sury | |
| 5,242,604 A | 9/1993 | Young et al. | |
| 5,264,118 A | 11/1993 | Cymerman et al. | |
| 5,302,294 A | 4/1994 | Schubert et al. | |
| 5,316,664 A | 5/1994 | Gregoli et al. | |
| 5,340,467 A | 8/1994 | Gregoli et al. | |
| 5,350,525 A | 9/1994 | Shaw et al. | |
| 5,458,770 A | 10/1995 | Fentz | 210/168 |
| 5,538,631 A | 7/1996 | Yeh | 210/221.2 |
| 5,554,301 A | 9/1996 | Rippetoe et al. | 210/748 |
| 5,556,545 A | 9/1996 | Volchek et al. | |
| 5,620,594 A | 4/1997 | Smith et al. | |
| 5,667,543 A | 9/1997 | Brouwers | |
| 5,667,686 A | 9/1997 | Schubert | |
| 5,711,374 A | 1/1998 | Kjos | |
| 5,740,834 A | 4/1998 | Sherowski | |
| 5,766,484 A | 6/1998 | Petit et al. | 210/703 |
| 5,840,198 A | 11/1998 | Clarke | |
| 5,879,541 A | 3/1999 | Parkinson | |
| 5,958,256 A | 9/1999 | Ocel, Jr. et al. | |
| 5,965,023 A | 10/1999 | Schaller | 210/540 |
| 5,996,690 A | 12/1999 | Shaw et al. | |
| 6,077,433 A | 6/2000 | Brun Henriksen et al. | |
| 6,119,870 A | 9/2000 | Maciejewski et al. | |
| 6,189,613 B1 | 2/2001 | Chachula et al. | |
| 6,197,095 B1 | 3/2001 | Ditria et al. | |
| 6,213,208 B1 | 4/2001 | Skilbeck | |
| 6,322,845 B1 | 11/2001 | Dunlow | |
| 6,346,069 B1 | 2/2002 | Collier | |
| 6,378,608 B1 | 4/2002 | Nilsen et al. | |
| 6,398,973 B1 | 6/2002 | Saunder et al. | |
| 6,468,330 B1 | 10/2002 | Irving et al. | |
| 6,543,537 B1 | 4/2003 | Kjos | |
| 6,596,170 B2 | 7/2003 | Tuszko et al. | |
| 6,607,437 B2 | 8/2003 | Casey et al. | |
| 6,702,877 B1 | 3/2004 | Swanborn | |
| 6,719,681 B2 | 4/2004 | Collier | |
| 6,730,236 B2 | 5/2004 | Kouba | |
| 6,800,116 B2 | 10/2004 | Stevens et al. | |
| 6,800,208 B2 | 10/2004 | Bolman | |
| 7,011,219 B2 | 3/2006 | Knox-Holmes et al. | |
| 7,060,017 B2 | 6/2006 | Collier | |
| 7,128,375 B2 | 10/2006 | Watson | 299/8 |
| 2001/0005986 A1 | 7/2001 | Matsubara et al. | |
| 2001/0042713 A1 | 11/2001 | Conrad et al. | |
| 2002/0018842 A1 | 2/2002 | Dunlow | |
| 2002/0068673 A1 | 6/2002 | Collier | |
| 2002/0068676 A1 | 6/2002 | Collier | |
| 2002/0148777 A1 | 10/2002 | Tuszko | |
| 2003/0085185 A1 | 5/2003 | Kouba | |
| 2003/0168391 A1 | 9/2003 | Tveiten | |
| 2004/0055972 A1 | 3/2004 | Garner et al. | |
| 2004/0069705 A1 | 4/2004 | Tuszko et al. | |
| 2004/0094456 A1 | 5/2004 | Dries | |
| 2004/0140099 A1 | 7/2004 | Hauge et al. | |
| 2004/0182754 A1 | 9/2004 | Lange | |
| 2004/0192533 A1 | 9/2004 | Collier | |
| 2005/0016904 A1 | 1/2005 | Knox-Holmes et al. | |
| 2006/0112724 A1 | 6/2006 | Chang et al. | |
| 2006/0122449 A1 | 6/2006 | van Egmond | |
| 2006/0138036 A1 | 6/2006 | Garner et al. | |
| 2006/0138055 A1 | 6/2006 | Garner et al. | |
| 2007/0187321 A1* | 8/2007 | Bjornson et al. | 210/512.3 |
| 2008/0149542 A1* | 6/2008 | Bjornson et al. | 210/512.1 |

FOREIGN PATENT DOCUMENTS

| | | |
|---|---|---|
| CA | 970308 | 7/1975 |
| CA | 1026252 | 2/1978 |
| CA | 1059052 | 7/1979 |
| CA | 1066644 | 11/1979 |
| CA | 1072473 | 2/1980 |
| CA | 1097574 | 3/1981 |
| CA | 1126187 | 6/1982 |
| CA | 1138822 | 4/1983 |
| CA | 1194622 | 1/1985 |
| CA | 1201412 | 3/1986 |
| CA | 1254171 | 5/1989 |
| CA | 1267860 | 4/1990 |
| CA | 2000984 | 4/1991 |
| CA | 2037856 | 9/1991 |
| CA | 1283465 | 12/1991 |
| CA | 2024756 | 5/1992 |
| CA | 1305390 | 7/1992 |
| CA | 2058221 | 7/1992 |
| CA | 1318273 | 5/1993 |
| CA | 1322177 | 9/1993 |
| CA | 1325180 | 12/1993 |
| CA | 2088227 | 4/1994 |
| CA | 2108521 | 4/1994 |
| CA | 2086073 | 6/1994 |
| CA | 2155198 | 8/1994 |
| CA | 2184613 | 11/1995 |
| CA | 2180686 | 2/1997 |
| CA | 2231543 | 3/1997 |
| CA | 2263691 | 3/1998 |
| CA | 2249679 | 4/1999 |
| CA | 2308410 | 5/1999 |
| CA | 2236183 | 10/1999 |
| CA | 2246841 | 3/2000 |
| CA | 2365008 | 8/2000 |
| CA | 2298122 | 7/2001 |
| CA | 2090618 | 10/2001 |
| CA | 2358805 | 10/2001 |
| CA | 2311738 | 11/2001 |
| CA | 2409129 | 11/2001 |
| CA | 2315596 | 2/2002 |
| CA | 2332207 | 2/2002 |
| CA | 857306 | 3/2002 |
| CA | 873854 | 3/2002 |

| | | |
|---|---|---|
| CA | 882667 | 3/2002 |
| CA | 910271 | 3/2002 |
| CA | 2217300 | 8/2002 |
| CA | 2419325 | 8/2003 |
| CA | 2435113 | 1/2005 |
| CA | 2436158 | 1/2005 |
| CA | 2439436 | 3/2005 |
| CA | 2532737 | 3/2005 |
| CA | 2535702 | 3/2005 |
| CA | 2537603 | 3/2005 |
| CA | 2483896 | 4/2005 |
| CA | 2493677 | 6/2005 |
| CA | 2549895 | 6/2005 |
| CA | 2554725 | 6/2005 |
| CA | 2454942 | 7/2005 |
| CA | 2455623 | 7/2005 |
| CA | 2462359 | 9/2005 |
| CA | 2558424 | 10/2005 |
| CA | 2467372 | 11/2005 |
| CA | 2565980 | 12/2005 |
| CA | 2510099 | 1/2006 |
| CA | 2517811 | 2/2006 |
| CA | 2538464 | 2/2006 |
| CA | 2563922 | 3/2006 |
| CA | 2520943 | 4/2006 |
| CA | 2522031 | 4/2006 |
| CA | 2580836 | 4/2006 |
| CA | 2582078 | 4/2006 |
| CA | 2506398 | 5/2006 |
| CA | 2587866 | 6/2006 |
| CA | 2494391 | 7/2006 |
| CN | 1112033 | 11/1995 |
| CN | 2263552 Y | 10/1997 |
| CN | 2520942 Y | 11/2002 |
| CN | 1701856 | 11/2005 |
| EP | 262916 | 6/1988 |
| EP | 355127 | 6/1989 |
| EP | 332641 | 3/1994 |
| EP | 605746 | 7/1994 |
| EP | 1600215 | 11/2005 |
| EP | 1501636 | 8/2006 |
| GB | 195055 | 1/1924 |
| GB | 726841 | 3/1955 |
| GB | 814610 | 6/1959 |
| GB | 1302064 | 1/1973 |
| GB | 2047735 | 1/1980 |
| GB | 2075543 | 11/1981 |
| GB | 2088234 | 6/1982 |
| GB | 2116447 | 9/1983 |
| JP | 61082856 | 4/1986 |
| WO | WO 94/23823 | 10/1994 |
| WO | WO 00/74815 | 12/2000 |
| WO | WO 03/068407 | 8/2003 |
| WO | WO 03/092901 | 11/2003 |
| WO | WO 2004/005673 | 1/2004 |
| WO | WO 2005/044871 | 5/2005 |
| WO | WO 2006/085759 | 8/2006 |

OTHER PUBLICATIONS

Restriction Requirement dated Dec. 12, 2008 for U.S. Appl. No. 11/595,817.
Office Action dated Mar. 2, 2009 for U.S. Appl. No. 11/595,817.
Office Action dated Jul. 21, 2009 for U.S. Appl. No. 11/595,817.
Office Action dated Jan. 21, 2010 for U.S. Appl. No. 11/595,817.
Office Action dated Aug. 6, 2010 for U.S. Appl. No. 11/595,817.
Office Action dated Mar. 17, 2011 for U.S. Appl. No. 11/595,817.
Notice of Allowance dated Sep. 16, 2011 for U.S. Appl. No. 11/595,817.
Restriction Requirement dated Feb. 24, 2011 for U.S. Appl. No. 11/938,226.
Office Action dated Jul. 28, 2011 for U.S. Appl. No. 11/938,226.
Related pending U.S. Appl. No. 11/360,597, filed Feb. 24, 2006. Title: Bituminous Froth Hydrocarbon Cyclone. Inventors: Garner et al.
Related pending U.S. Appl. No. 11/360,489, filed Feb. 24, 2006. Title: Bituminous Froth Inclined Plate Separator and Hydrocarbon Cyclone Treatment Process. Inventors: Garner et al.
Related pending U.S. Appl. No. 11/486,302, filed Jul. 13, 2006. Title: Bituminous Froth Inclined Plate Separator and Hydrocarbon Cyclone Treatment Process. Inventors: Garner et al.
Related pending U.S. Appl. No. 11/759,151, filed Jun. 6, 2007. Title: System and Process for Concentrating Hydrocarbons in a Bitumen Feed. Inventors: Garner et al.
Rimmer, et al. "Hydrocyclone-Based Process for Rejecting Solids from Oil Sands at the Mine Site while Retaining Bitumen Transportation to a Processing Plant"; paper delivered on Monday Apr. 5, 1993 at a conference in Alberta, Canada entitled "Oil Sands—Our Petroleum Future."
National Energy Board, Canada's Oil Sands: A Supply and Market Outlook to 2015, An Energy Market Assessment Oct. 2000.
Krebs' Engineers, Krebs D-Series gMAX DeSanders for Oil and Gas, Bulletin 11-203WEL.
Eva Mondt "Compact Centrifugal Separator of Dispersed Phases" Proefschrift, 2005.
Natural Resources Canada, Treatment of Bitumen Froth and Slop Oil Tailings, Dec. 2001.

* cited by examiner

PROCESS AND APPARATUS FOR TREATING A HEAVY HYDROCARBON FEEDSTOCK

BACKGROUND

1. Field of Invention

This invention relates generally to hydrocarbon extraction and more particularly to a process and apparatus for treating a heavy hydrocarbon feedstock having a specific gravity differential between components of the feedstock.

2. Description of Related Art

Heavy hydrocarbon feedstocks are generally viscous and may be entrained with other components such as rock, sand, clay, and other minerals. As a result, heavy hydrocarbons require processing to separate useful hydrocarbon products from residue before transport and refining.

One example of a heavy hydrocarbon ore deposit is the Northern Alberta oil sands, which comprises about 70 to about 90 percent by weight of mineral solids including sand and clay, about 1 to about 10 percent by weight of water, and a bitumen or oil film. The bitumen may be present in amounts ranging from a trace amount up to as much as 20 percent by weight. Due to the highly viscous nature of bitumen, when excavated some of the ore may remain as clumps of oversize ore, requiring sizing to produce a sized ore feed suitable for processing. The ore may also be frozen due to the northerly geographic location of many oil sands deposits, making sizing of the ore more difficult. The sized ore feed is typically processed by adding water to form a slurry in a location proximate to the ore deposit, and the resulting slurry is hydro-transported through a pipeline to a processing plant for separation of the hydrocarbon products from the sand and other minerals.

Low specific gravity hydrocarbons may be separated from sand and water, which generally have higher specific gravity, by accumulating the feedstock in a separation vessel and allowing gravity separation to occur. Such a separation vessel may have a large diameter relative to side wall height and may include a conical bottom for sand removal. For adequate separation of hydrocarbons, the relatively quiescent conditions of the accumulated feedstock may be required in the vessel, which has the adverse effect of allowing neutral density asphaltene mats to accumulate at an interface between the separated hydrocarbon products and the water. These asphaltene mats accumulate as rag layers and may be difficult to remove.

There remains a need for improved processes and apparatus for treating heavy hydrocarbon feedstocks.

SUMMARY

In accordance with one aspect of the invention there is provided an apparatus for treating a heavy hydrocarbon feedstock having a specific gravity differential between components of the feedstock. The apparatus includes a treatment vessel having an inlet for receiving the feedstock. The apparatus also includes a primary separation container located in the treatment vessel, the primary separation container being operable to accumulate feedstock to cause a low specific gravity portion of the feedstock to separate and rise to an upper surface of the accumulated feedstock. The apparatus also includes a first weir for collecting the low specific gravity portion from the surface of the accumulated feedstock in the primary separation container. The apparatus further includes a first outlet in the primary separation container, the first outlet being operably configured to receive settling solids in the accumulated feedstock and to produce a first discharge stream at the first outlet. The apparatus also includes a secondary separation container located in the treatment vessel to receive the collected low specific gravity portion, the secondary separation container being operable to accumulate the collected low specific gravity portion to cause hydrocarbon products to separate and rise to an upper surface of the accumulated low specific gravity portion of the feedstock. The apparatus further includes a product outlet for collecting the hydrocarbon products from the upper surface of the accumulated low specific gravity portion to produce a hydrocarbon product stream at the product outlet.

The apparatus may include a feed manifold operably configured to receive a flow of feedstock from the inlet and cause the feedstock to flow along the feed manifold to the primary separation container for conditioning the feedstock flow to facilitate separation of the low specific gravity portion in the primary separation container.

The feed manifold may include a plurality of adjacently located open channels extending between the inlet and the primary separation container, the open channels being operable to reduce turbulence intensity in the feedstock flow.

The feed manifold may be operably configured to cause a feedstock flow into the primary separation container having a Reynolds Number of about 20,000.

The primary separation container may include a downwardly inclined base operably configured to direct settling solids in the accumulated feedstock toward the first outlet of the treatment vessel.

The downwardly inclined base defines a first portion of the primary separation container and the primary separation container may further include a second portion of the primary separation container located to receive the solids from the downwardly inclined base, the first outlet being located at a low point in the second portion of the primary separation container.

The secondary separation container may be located generally below the downwardly inclined base of the primary separation container.

The first weir may include a catchment located behind the weir, the catchment being operable to receive the collected low specific gravity portion and to direct the collected low specific gravity portion to the secondary separation container.

The apparatus may include a conduit extending between the catchment and the secondary separation container.

The first weir may include a weir having a J-shaped cross section.

The first weir may include a serpentine weir.

The first weir may be positioned to collect the low specific gravity portion from a first area of the upper surface of the accumulated feedstock in the primary separation container, and the apparatus may further include a second weir positioned proximate a second area of the upper surface of the accumulated feedstock in the primary separation container, the second weir being operable to permit feedstock in the second area from which a substantial portion of the low specific gravity portion has been collected to overflow to produce a second discharge stream at a second outlet.

The apparatus may include a first launder box located to receive and accumulate overflowing feedstock from the second weir and the second outlet may be located at a low point in the first launder box.

The second discharge stream may include at least water and a fine solids component.

The first discharge stream may include at least water and a coarse solids component.

The first discharge stream may further include asphaltenes.

The apparatus may include a third outlet located in the secondary separation container of the treatment vessel, the third outlet being located at a low point in the secondary separation container for producing a third discharge stream at the third outlet.

The third outlet may include a water boot disposed below the secondary separation container, the water boot having an outlet for discharging the third discharge stream.

The product outlet may include a third weir located in the secondary separation container to cause the hydrocarbon products in the accumulated low specific gravity portion to overflow to produce the hydrocarbon stream at the product outlet.

The product outlet may include a second launder box located to receive and accumulate the overflowing low specific gravity portion from the third weir and the product outlet may be located at a low point in the second launder box.

The feedstock may include an added diluent and the hydrocarbon product may include a hydrocarbon product portion and a diluent portion.

The added diluent may include one of a paraffinic diluent and a naphthenic diluent.

The feedstock may include at least about 60% diluent.

The treatment vessel may include a pressure containment vessel and may further include at least one gas outlet operably configured to discharge gaseous products released from the feedstock during treatment.

The apparatus may include a regulator regulating an operating pressure in the treatment vessel.

The regulator may be operably configured to regulate the operation pressure by causing the at least one gas outlet to be activated to release gaseous products when the operating pressure in the treatment vessel is above a pre-determined maximum operating pressure, and by introducing a supplementary pressurizing gas when the operating pressure in the treatment vessel falls below a pre-determined minimum operating pressure.

In accordance with another aspect of the invention there is provided a process for treating a heavy hydrocarbon feedstock having a specific gravity differential between components of the feedstock. The process involves receiving the feedstock at an inlet of a treatment vessel, and accumulating feedstock in a primary separation container in the treatment vessel to cause a low specific gravity portion of the feedstock to separate and rise to an upper surface of the accumulated feedstock. The process also involves collecting the low specific gravity portion from the surface of the accumulated feedstock in the primary separation container, and directing settling solids in the accumulated feedstock toward a first outlet of the treatment vessel to produce a first discharge stream at the first outlet. The process further involves accumulating the collected low specific gravity portion in a secondary separation container in the treatment vessel to cause hydrocarbon products to separate and rise to an upper surface of the accumulated low specific gravity portion, and collecting the hydrocarbon products from the upper surface of the accumulated low specific gravity portion to produce a hydrocarbon product stream at a product outlet.

Receiving the feedstock may involve receiving a flow of feedstock at the inlet and causing the feedstock to flow along a feed manifold between the inlet and the primary separation container for conditioning the feedstock flow to facilitate separation of the low specific gravity portion in the primary separation container.

Conditioning the feedstock flow may involve causing the feedstock to flow along a plurality of adjacently located open channels extending between the inlet and the primary separation container, the open channels being operable to reduce turbulence intensity in the feedstock flow.

Causing the feedstock to flow along the feed manifold may involve causing a feedstock flow into the primary separation container having a Reynolds Number of about 20,000, which is significantly higher than flow rates in conventional API separators.

Directing settling solids in the accumulated feedstock toward the first outlet of the treatment vessel may involve causing the solids to be directed along a downwardly inclined base of the primary separation container toward the first outlet.

The downwardly inclined base may define a first portion of the primary separation container and the method may further involve receiving the settling solids in a second portion of the primary separation container located to receive the solids from the downwardly inclined base, the first outlet being located at a low point in the second portion of the primary separation container.

Accumulating the low specific gravity portion in the secondary separation container may involve accumulating the low specific gravity portion in a secondary separation container located generally below the downwardly inclined base of the primary separation container.

Collecting the low specific gravity portion may involve overflowing the low specific gravity portion at a first weir disposed to receive an overflow stream from the primary separation container.

Collecting the low specific gravity portion may involve receiving the low specific gravity portion overflowing the first weir in a catchment located behind the weir and directing the collected low specific gravity portion to the secondary separation container.

Directing the collected low specific gravity portion to the secondary separation container may include causing the collected low specific gravity portion to flow through a conduit extending between the catchment and the secondary separation container.

Receiving the low specific gravity portion at the first weir may involve receiving the low specific gravity portion at a weir having a J-shaped cross section.

Receiving the low specific gravity portion at the first weir may involve receiving the low specific gravity portion at a serpentine weir.

Collecting the low specific gravity portion may involve collecting the low specific gravity portion from a first area of the upper surface of the accumulated feedstock and may further involve overflowing feedstock from a second area of the upper surface from which a substantial portion of the low specific gravity portion has been collected to produce a second discharge stream at a second outlet of the treatment vessel.

Overflowing feedstock from the second area of the upper surface may involve causing the feedstock to overflow into a first launder box, the second outlet being located at a low point in the first launder box.

Producing the second discharge stream may involve producing a second discharge stream including at least water and a fine solids component.

Producing the first discharge stream may involve producing a discharge stream including at least water and a coarse solids component.

Producing the first discharge stream may involve producing a discharge stream including asphaltenes.

The process may involve producing a third discharge stream at a third outlet of the treatment vessel, the third outlet being located at a low point of the secondary separation container.

Producing the third discharge stream at the third outlet may involve causing aqueous components to be collected in a water boot disposed below the secondary separation container, the water boot having an outlet for discharging the third discharge stream.

Collecting the hydrocarbon products may involve overflowing the accumulated low specific gravity portion.

Overflowing the accumulated low specific gravity portion may involve causing the hydrocarbon products in the low specific gravity portion of the feedstock to overflow into a second launder box, the product outlet being located at a low point in the second launder box.

The feedstock may include an added diluent, and collecting the hydrocarbon products may involve collecting a hydrocarbon product portion and a diluent portion.

The added diluent may include one of a paraffinic diluent and a naphthenic diluent.

The feedstock may include at least about 60% diluent.

The treatment vessel may include a pressure containment vessel and the method may further involve causing gaseous products released from the feedstock during treatment to be discharged from the treatment vessel through at least one gas outlet.

The process may involve regulating an operating pressure in the treatment vessel.

Regulating the operation pressure may involve causing the at least one gas outlet to be activated to release gaseous products when the operating pressure in the treatment vessel may be above a pre-determined maximum operating pressure, and introducing a supplementary pressurizing gas when the operating pressure in the treatment vessel falls below a pre-determined minimum operating pressure.

In accordance with another aspect of the invention there is provided an apparatus for treating a heavy hydrocarbon feedstock having a specific gravity differential between components of the feedstock. The apparatus includes provisions for receiving the feedstock at an inlet of a treatment vessel, and provisions for accumulating feedstock in a primary separation container in the treatment vessel to cause a low specific gravity portion of the feedstock to separate and rise to an upper surface of the accumulated feedstock. The apparatus also includes provisions for collecting the low specific gravity portion from the surface of the accumulated feedstock in the primary separation container, and provisions for directing settling solids in the accumulated feedstock toward a first outlet of the treatment vessel to produce a first discharge stream at the first outlet. The apparatus further includes provisions for accumulating the collected low specific gravity portion in a secondary separation container in the treatment vessel to cause hydrocarbon products to separate and rise to an upper surface of the accumulated low specific gravity portion, and provisions for collecting the hydrocarbon products from the upper surface of the accumulated low specific gravity portion to produce a hydrocarbon product stream at a product outlet.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
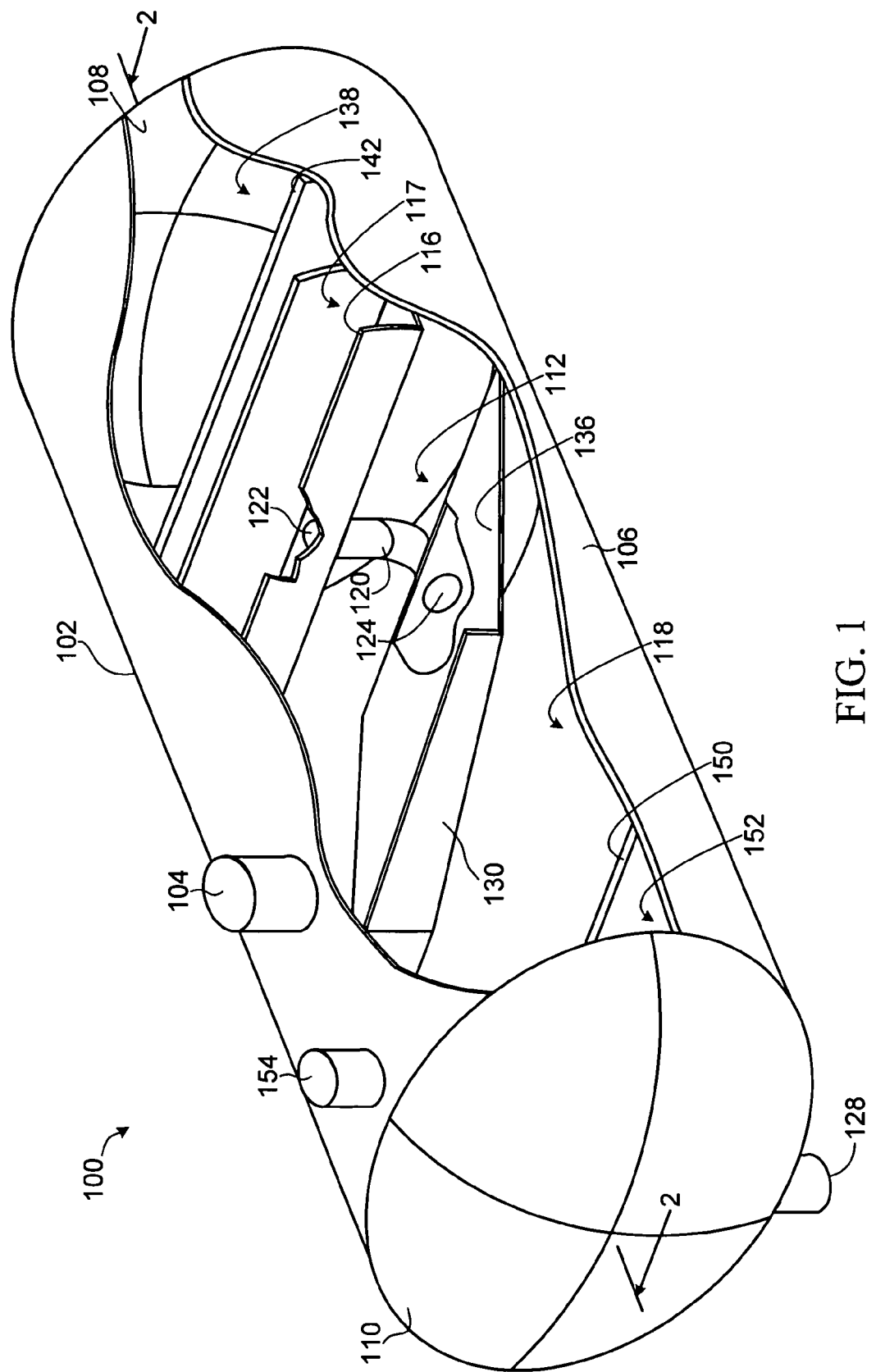
FIG. 1 is a partially cut-away perspective view of a treatment vessel apparatus in accordance with a first embodiment of the invention.

Referring to FIG. 1, an apparatus for treating a heavy hydrocarbon feedstock according to a first embodiment of the invention is shown generally at 100. The apparatus 100 includes a treatment vessel 102 having an inlet 104 for receiving the feedstock. The feedstock has a specific gravity differential between components of the feedstock.

In this embodiment the treatment vessel 102 includes a cylindrical portion 106 having first and second dome-shaped end walls 108 and 110. The cylindrical section 104 may be fabricated from a carbon steel pipe section having a wall thickness of about 12 mm. In other embodiments where the feedstock is corrosive, the inside surfaces of the treatment vessel 102 may be treated to resist corrosion or a corrosion resistant metal may be used to fabricate the treatment vessel. In one embodiment the treatment vessel 102 may have a length of about 20 meters and a diameter of about 7 meters. Advantageously, fabrication of the treatment vessel 102 may occur at an off-site location, since the aspect ratio of the cylindrical section 104 would permit subsequent transport to the processing location. In contrast, many prior art conical bottom separators must be fabricated on-site due to their large diameter.

Figure 2:
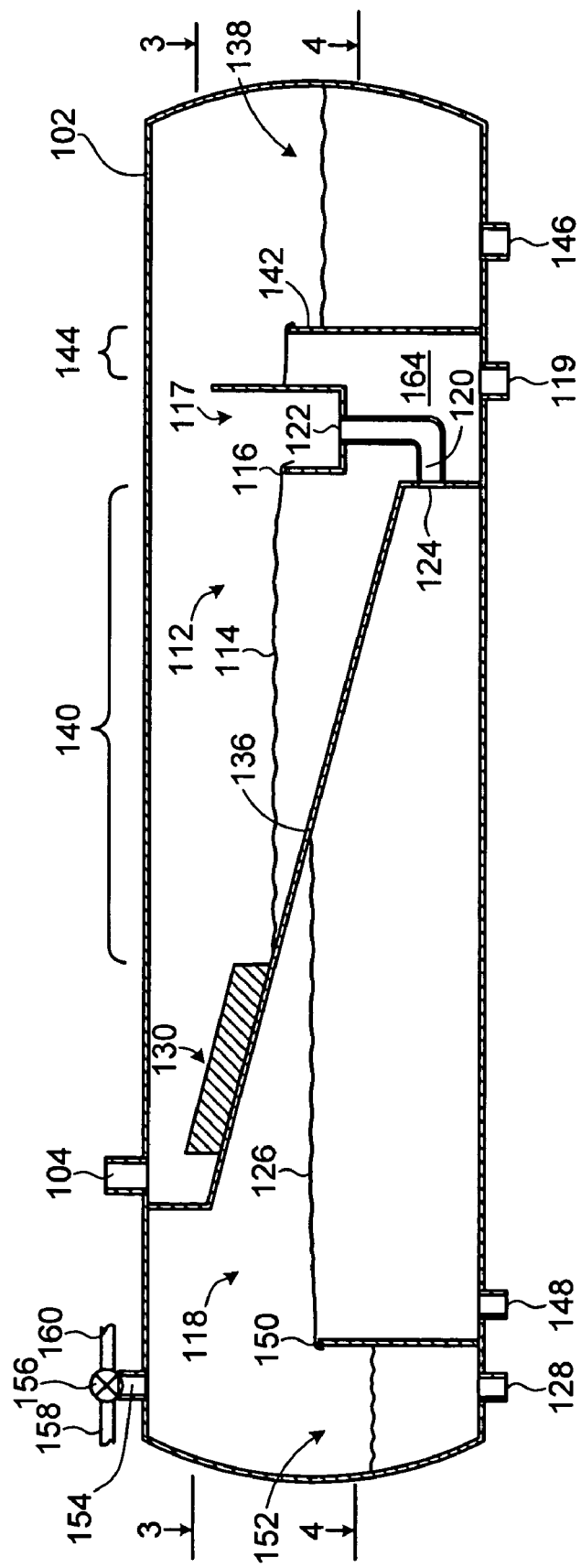
FIG. 2 is a cross sectional view of the treatment vessel taken along a line 2-2 in FIG. 1.

The apparatus 100 also includes a primary separation container 112 located in the treatment vessel 102. The treatment vessel 102 is shown in cross-section in FIG. 2. Referring to FIG. 2, the primary separation container 112 is operable to accumulate feedstock to cause a low specific gravity portion of the feedstock to separate and rise to an upper surface 114 of the accumulated feedstock.

The primary separation container 112 also includes a first weir 116 and a catchment 117 located behind the first weir for collecting the low specific gravity portion from the surface of the accumulated feedstock. The primary separation container 112 further includes a first outlet 119 operably configured to receive settling solids in the accumulated feedstock and to produce a first discharge stream at the first outlet.

The treatment vessel 102 further includes a secondary separation container 118. The secondary separation container 118 is located to receive the low specific gravity portion collected at the catchment 117. Referring back to FIG. 1, in the embodiment shown the primary separation container 112 includes a conduit 120 having an inlet opening 122 in the catchment 117 for receiving the collected low specific gravity portion and an outlet 124 for discharging the collected low specific gravity portion into the secondary separation container 118.

The secondary separation container 118 is operable to accumulate the collected low specific gravity portion to cause hydrocarbon products to separate and rise to an upper surface 126 of the accumulated low specific gravity portion of the feedstock.

Referring back to FIG. 2, the treatment vessel 102 further includes a product outlet 128 for collecting the hydrocarbon products from the upper surface 126 of the accumulated low specific gravity portion to produce a hydrocarbon product stream at the product outlet. In this embodiment the product outlet 128 is located in a second launder box 152 defined by a third weir 150. The product outlet 128 is located at a low point in the second launder box 152.

In this embodiment the treatment apparatus 102 includes a feed manifold 130, which is operably configured to receive a flow of feedstock from the inlet 104 and to cause the feedstock to flow along the feed manifold to the primary separation container 112. The feed manifold is operable to direct the feedstock flow to the primary separation container 112 while conditioning the flow to facilitate separation of the low specific gravity portion in the primary separation container.

Figure 3:
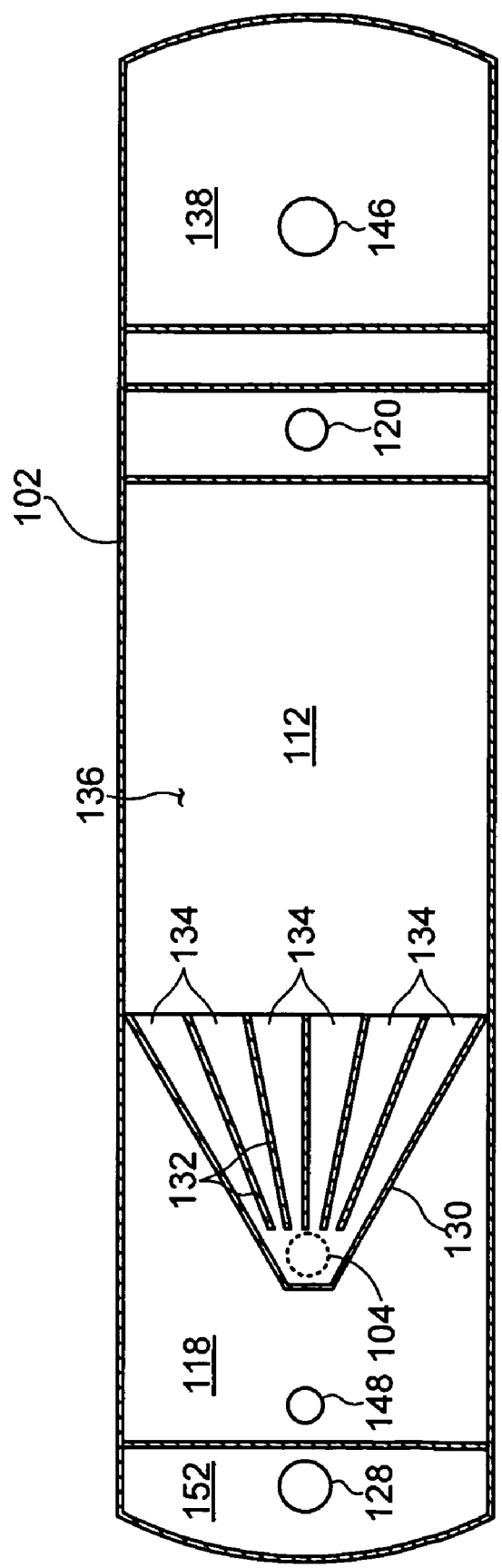
FIG. 3 is another cross sectional view of the treatment vessel taken along a line 3-3 in FIG. 2.

The apparatus 100 is shown in cross section in FIG. 3. Referring to FIG. 3, the feed manifold 130 includes a plurality of baffles 132 forming a plurality of channels 134, which receive a flow of feedstock from the inlet 104 and channel the feedstock flow to the primary separation container 112. In other embodiments, the feed manifold 130 may include a plurality of ridges for conditioning the feedstock flow (not shown) in place of the baffles 132.

Referring back to FIG. 2, in this embodiment the primary separation container 112 includes a downwardly inclined base 136 operably configured to direct settling solids in the accumulated feedstock toward the first outlet 118 of the treatment vessel 102. The downwardly inclined base 136 also forms a dividing wall between the primary separation container 112 and the secondary separation container 118.

In the embodiment shown, the first weir 116 has a generally J-shaped cross section, which defines the catchment 117. In other embodiments apparatus 100 may include a serpentine weir. Serpentine weirs have increased length in the path of the flow, which increases the flow rate capacity of the weir.

The apparatus 100 also includes a second weir 142 positioned proximate the end wall 108 and defining a first launder box 138 located to receive and accumulate feedstock overflowing from the second weir 142. The second weir 142 separates the first launder box 138 from the primary separation container 112. The apparatus 100 also includes a second outlet 146, which is located at a low point in the first launder box 138.

The apparatus 100 also includes a third outlet 148 located at a low point of the secondary separation container 118. In one embodiment the third outlet 148 comprises a water boot.

In one embodiment the treatment vessel 102 is operably configured to operate under a positive pressure, and the treatment vessel includes a gas outlet 154, which is operable to discharge gaseous products released from the feedstock during treatment. In this embodiment, the gas outlet 154 is in communication with first and second conduits 158 and 160 through a regulator 156 for regulating operating pressure in the treatment vessel 102, as described later.

Figure 4:
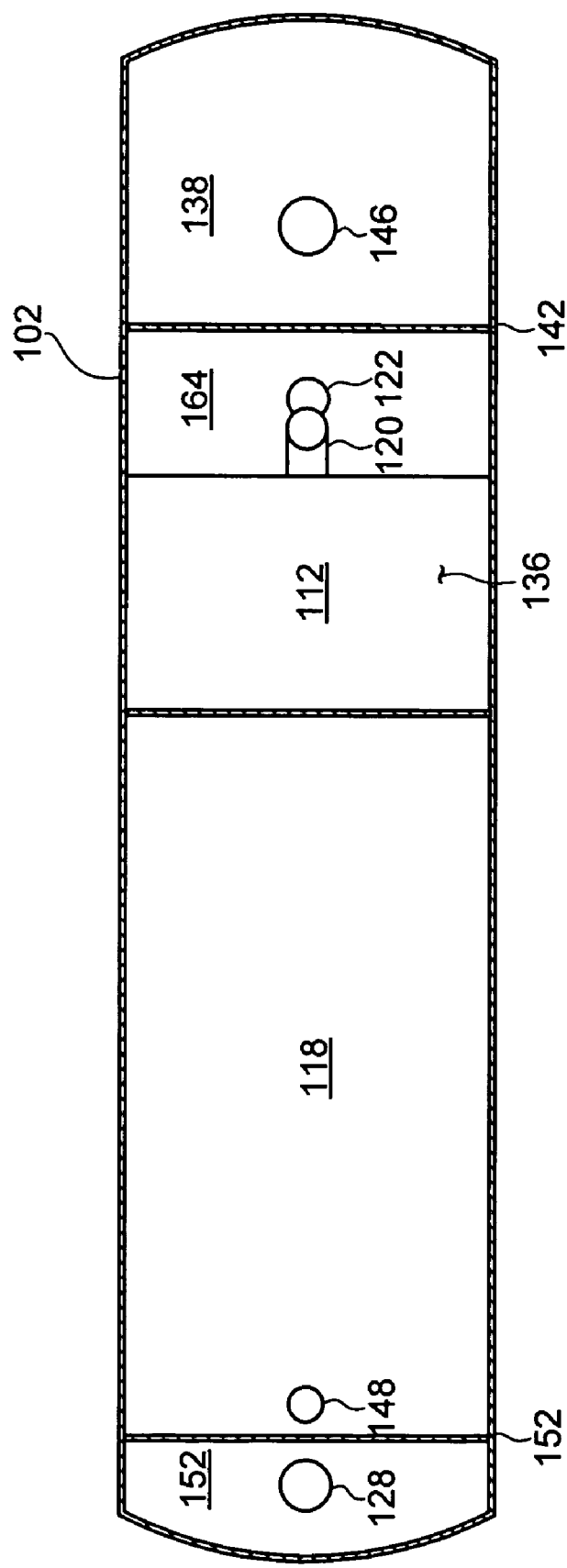
FIG. 4 is further cross sectional view of the treatment vessel taken along a line 4-4 in FIG. 2.

A further cross section through the secondary separation container 112 of the apparatus 100 is shown in cross section in FIG. 4. In FIG. 4, a portion of the downwardly inclined base 136 is shown, and the container 118 extends from under the downwardly inclined base to the third weir 150.

Operation

The operation of the treatment 102 is described in greater detail with reference to FIG. 1 and FIG. 2. Referring to FIG. 2, a flow of heavy hydrocarbon feedstock is received at the inlet 104 and directed to the feed manifold 130. In general, the flow rate of the feedstock flow may fluctuate over time.

In one embodiment the heavy hydrocarbon feedstock comprises heated and de-aerated bitumen froth. An exemplary bitumen froth may comprise about 80% hydrocarbon products, about 15% water, and about 5% solids. The solids may include sand, minerals, and other fine solids. The bitumen froth may also have an added diluent. For example, the diluent may comprise napthatenic or paraffinic compounds, and may be present in a proportion of 60-80% of the feedstock. Advantageously, the configuration of the treatment vessel 102 provides relatively shallow accumulations in the primary separation container 112 and the secondary separation container 118, thus limiting the inventory of feedstock, and hence diluent, in the treatment vessel. Conventional diluents are generally of more value than the hydrocarbon products being extracted and thus minimizing the diluent volume required is desirable.

The feedstock components generally have a specific gravity differential that is sufficient to cause gravity separation under horizontal flow conditions through the primary separation container 112. The hydrocarbon components (including diluent, if added) will generally have a specific gravity of less than unity, while the sand and other minerals will generally have a specific gravity greater than unity. Fine solids, such as silt, may be largely suspended in the water, which will have a specific gravity of close to unity.

Referring to FIG. 3, the feedstock is separated into a plurality of separate flows by the baffles 132 into the open channels 134, which spread out the feedstock flow to provide a uniform feed into the primary separation container 112. The open channels 134 operate to reduce turbulence intensity and prevent formation of eddy currents in the feedstock flow, which would tend to disrupt or delay onset of gravity separation. For efficient operation of the apparatus 100, the flow rate of the feedstock should be as high as possible, without generating excessive turbulence in the primary separation container 112. Currents due to turbulence may work against upward movement and separation of the low specific gravity portion of the feedstock. In one exemplary embodiment the feedstock flow into the primary separation vessel 112 has a Reynolds number of about 20,000.

In embodiments where the feedstock includes a paraffinic diluent, the feed manifold also conditions the stream by providing sufficient time to permit precipitation coalescence of asphaltenes to occur.

The feedstock entering the primary separation container 112 accumulates to a level of the weir 116. In embodiments where the feedstock flow rate is very high, the weir 116 may be configured in a serpentine shape to increase the flow volume over the lip into the catchment 117 for controlling accumulation level in the primary separation container 112. Advantageously, the first weir 116 controls the accumulation level of feedstock in the primary separation container 112, despite variations in feedstock flow rate at the inlet 104.

The lower specific gravity portion of the feedstock rises to the upper surface 114 of the accumulated feedstock, while higher specific gravity sand and other minerals begin to settle out along the downwardly inclined base 136. The base 136 also directs the solids along toward a portion 164 of the primary separation container 112. In embodiments where precipitation of asphaltenes occurs, precipitated asphaltenes are also directed along the base toward the portion 164 of the primary separation container 112. A cylindrical portion 106 of the treatment vessel provides a rounded base in the container portion 164, which further aids in directing solids and asphaltenes towards the first outlet 119, thus producing a first discharge stream as a slurry of predominantly coarse solids, asphaltenes, and water. Advantageously, the downwardly inclined base 136 also serves to slow down the cross-sectional flow rate of the feedstock proximate the first weir 116.

The first weir 116 collects a substantial portion of low specific gravity hydrocarbon products in the catchment 117. The collected low specific gravity portion is received at the inlet 122 of the conduit 120 and directed to the secondary separation container 118. The collected low specific gravity portion may include some proportion of water, since complete separation at the first weir 116 of hydrocarbon products from water is not practically achievable due to a under high flow rate regimen.

The first weir 116 thus collects a substantive portion of the low specific gravity portion of the feedstock from an area 140 between an end of the feed manifold 130 and the first weir 116. The first weir 116 also presents a barrier to passage of the hydrocarbon products past the weir to an area 144 between the first weir 116 and the second weir 142. Accordingly, the feedstock portion overflows at the second weir 142 has relatively low hydrocarbon product content and the first launder box 138 produces a second discharge stream that comprises predominantly water and fine solids.

Advantageously, in this embodiment the primary separation container 112 has a relatively shallow separation pool, which facilitates construction of the secondary separation container 118 generally below the primary separation container.

The low specific gravity portion collected at the first weir 116 is conducted to the secondary separation container 118 and accumulates to a level of the third weir 150. As described above, the collected low specific gravity portion comprises predominantly water and hydrocarbon product since a substantial portion of the solids and asphaltenes are removed in the primary separation container 112. However, mixing in the primary separation container due to residual turbulence and a relatively short retention time under high flow rates may cause the collected low specific gravity portion to include at least some proportion of water. The hydrocarbon products in the secondary separation container 118 separate and rise to an upper surface 126 while aqueous components are drawn off as a third discharge stream at the third outlet 148. The third discharge stream thus predominantly comprises water, although some sand, asphaltenes, and/or other hydrocarbon products may be entrained in the third discharge stream.

As the collected low specific gravity portion continues to flow into the secondary separation container 118, the hydrocarbon products will overflow at the weir 150 into the second launder box 152, where the hydrocarbon products are discharged at the product outlet 128 as a hydrocarbon product stream. The hydrocarbon product stream may comprise a significant proportion of diluent, which may be recovered from the product stream for re-use.

As disclosed earlier, during operation of the apparatus 100, gaseous products may be released from the feedstock causing increased operating pressure in the treatment vessel 102. High operating pressure may result in damage to the treatment vessel while low operational pressure may result in the flashing of feedstock components. The pressure regulator 156 and conduits 158 and 160 facilitate maintaining the operating pressure of the treatment vessel 102 within a desired safe range. The regulator 156 is in communication with a source of pressurized gas (not shown) through the first conduit 158, and when the operating pressure in the treatment vessel falls below a pre-determined minimum operating pressure the regulator opens to allow the pressurized gas to enter the vessel. The pressurized gas may be a relatively inert gas, such as, for example, nitrogen. Alternatively, should the operating pressure rise above a pre-determined maximum operating pressure, the regulator 156 opens to vent gaseous products through the second conduit 160. The second conduit may be in communication with a recovery system (not shown) for recovering useful gaseous products or for safe disposal of the gaseous products.

In one embodiment, two or more of apparatus 100 may be vertically stacked for treating the feedstock in stages, with interstage feeding occurring via the force of gravity.

Advantageously, the flow path through the treatment vessel 102 is free flowing through all stages and thus the possibility of accumulating asphaltene mats, as described earlier, is limited by the relatively high flow rate through the vessel.

While specific embodiments of the invention have been described and illustrated, such embodiments should be considered illustrative of the invention only and not as limiting the invention as construed in accordance with the accompanying claims.

What is claimed is:

1. An apparatus for treating a heavy hydrocarbon feedstock having a specific gravity differential between components of the feedstock, the apparatus comprising:
   a treatment vessel having an inlet for receiving the feedstock;
   a primary separation container located in the treatment vessel, the primary separation container being operable to accumulate feedstock to cause a low specific gravity portion of the feedstock to separate and rise to an upper surface of the accumulated feedstock;
   a first weir for collecting the low specific gravity portion from the surface of the accumulated feedstock in the primary separation container;
   a first outlet in the primary separation container, the first outlet being operably configured to receive settling solids in the accumulated feedstock and to produce a first discharge stream at the first outlet;
   a secondary separation container located in the treatment vessel to receive the collected low specific gravity portion, the secondary separation container being operable to accumulate the collected low specific gravity portion to cause hydrocarbon products to separate and rise to an upper surface of the accumulated low specific gravity portion of the feedstock; and
   a product outlet for collecting hydrocarbon products from the upper surface of the accumulated low specific gravity portion to produce a hydrocarbon product stream at the product outlet.

2. The apparatus of claim 1 further comprising a feed manifold operably configured to receive a flow of feedstock from the inlet and cause the feedstock to flow along the feed manifold to the primary separation container for conditioning the feedstock flow to facilitate separation of the low specific gravity portion in the primary separation container.

3. The apparatus of claim 2 wherein the feed manifold comprises a plurality of adjacently located open channels extending between the inlet and the primary separation container, the open channels being operable to reduce turbulence intensity in the feedstock flow.

4. The apparatus of claim 2 wherein the feed manifold is operably configured to cause a feedstock flow into the primary separation container to have a Reynolds Number of about 20,000.

5. The apparatus of claim 1 wherein the primary separation container comprises a downwardly inclined base operably configured to direct settling solids in the accumulated feedstock toward the first outlet of the treatment vessel.

6. The apparatus of claim 5 wherein the downwardly inclined base defines a first portion of the primary separation container and wherein the primary separation container further comprises a second portion of the primary separation container located to receive the solids from the downwardly inclined base, said first outlet being located at a low point in the second portion of the primary separation container.

7. The apparatus of claim 5 wherein said secondary separation container is located generally below the downwardly inclined base of the primary separation container.

8. The apparatus of claim 1 wherein the first weir comprises a catchment located behind the weir, the catchment being operable to receive the collected low specific gravity portion and to direct the collected low specific gravity portion to the secondary separation container.

9. The apparatus of claim 8 further comprising a conduit extending between the catchment and the secondary separation container.

10. The apparatus of claim 8 wherein the first weir comprises a weir having a J-shaped cross section.

11. The apparatus of claim 1 wherein the first weir comprises a serpentine weir.

12. The apparatus of claim 1 wherein the first weir is positioned to collect the low specific gravity portion from a first area of the upper surface of the accumulated feedstock in the primary separation container, and further comprising a second weir positioned proximate a second area of the upper surface of the accumulated feedstock in the primary separation container, the second weir being operable to permit feedstock in the second area from which a substantial portion of the low specific gravity portion has been collected to overflow to produce a second discharge stream at a second outlet.

13. The apparatus of claim 12 further comprising a first launder box located to receive and accumulate overflowing feedstock from the second weir, wherein the second outlet is located at a low point in the first launder box.

14. The apparatus of claim 12 wherein the second discharge stream comprises at least water and a fine solids component.

15. The apparatus of claim 1 wherein the first discharge stream comprises at least water and a coarse solids component.

16. The apparatus of claim 15 wherein the first discharge stream further comprises asphaltenes.

17. The apparatus of claim 1 further comprising a third outlet located in the secondary separation container of the treatment vessel, the third outlet being located at a low point in the secondary separation container for producing a third discharge stream at the third outlet.

18. The apparatus of claim 17 wherein the third outlet comprises a water boot disposed below the secondary separation container, the water boot having an outlet for discharging the third discharge stream.

19. The apparatus of claim 1 wherein the product outlet comprises a third weir located in the secondary separation container to cause the hydrocarbon products in the accumulated low specific gravity portion to overflow to produce the hydrocarbon stream at the product outlet.

20. The apparatus of claim 19 wherein the product outlet comprises a second launder box located to receive and accumulate the overflowing low specific gravity portion from the third weir and wherein the product outlet is located at a low point in the second launder box.

21. The apparatus of claim 1 wherein the feedstock comprises an added diluent wherein the hydrocarbon product comprises a hydrocarbon product portion and a diluent portion.

22. The apparatus of claim 21 wherein the added diluent comprises one of:
a paraffinic diluent; or
a naphthenic diluent.

23. The apparatus of claim 21 wherein the feedstock comprises at least about 60% diluent.

24. The apparatus of claim 1 wherein the treatment vessel comprises a pressure containment vessel and further comprising at least one gas outlet operably configured to discharge gaseous products released from the feedstock during treatment.

25. The apparatus of claim 24 further comprising a regulator regulating an operating pressure in the treatment vessel.

26. The apparatus of claim 25 wherein the regulator is operably configured to regulate the operation pressure by:
causing said at least one gas outlet to be activated to release gaseous products when the operating pressure in the treatment vessel is above a pre-determined maximum operating pressure; and
introducing a supplementary pressurizing gas when the operating pressure in the treatment vessel falls below a pre-determined minimum operating pressure.

27. A process for treating a heavy hydrocarbon feedstock having a specific gravity differential between components of the feedstock, the process comprising:
receiving the feedstock at an inlet of a treatment vessel;
accumulating the feedstock in a primary separation container in the treatment vessel to cause a low specific gravity portion of the feedstock to separate and rise to an upper surface of the accumulated feedstock;
collecting with a first weir the low specific gravity portion from the surface of the accumulated feedstock in the primary separation container;
directing settling solids in the accumulated feedstock toward a first outlet of the treatment vessel to produce a first discharge stream at the first outlet;
accumulating the collected low specific gravity portion in a secondary separation container in the treatment vessel to cause hydrocarbon products to separate and rise to an upper surface of the accumulated low specific gravity portion; and
collecting the hydrocarbon products from the upper surface of the accumulated low specific gravity portion to produce a hydrocarbon product stream at a product outlet.

28. The process of claim 27 wherein receiving the feedstock comprises receiving a flow of feedstock at the inlet and causing the feedstock to flow along a feed manifold between the inlet and the primary separation container for conditioning the feedstock flow to facilitate separation of the low specific gravity portion in the primary separation container.

29. The process of claim 28 wherein conditioning the feedstock flow comprises causing the feedstock to flow along a plurality of adjacently located open channels extending between the inlet and the primary separation container, the open channels being operable to reduce turbulence intensity in the feedstock flow.

30. The process of claim 28 wherein causing the feedstock to flow along the feed manifold comprises causing a feedstock flow into the primary separation container having a Reynolds Number of about 20,000.

31. The process of claim 27 wherein directing settling solids in the accumulated feedstock toward the first outlet of the treatment vessel comprises causing the solids to be directed along a downwardly inclined base of the primary separation container toward the first outlet.

32. The process of claim 31 wherein the downwardly inclined base defines a first portion of the primary separation container and further comprising receiving the settling solids in a second portion of the primary separation container located to receive the solids from the downwardly inclined base, said first outlet being located at a low point in the second portion of the primary separation container.

33. The process of claim 31 wherein accumulating the low specific gravity portion in the secondary separation container comprises accumulating the low specific gravity portion in a secondary separation container located generally below the downwardly inclined base of the primary separation container.

34. The process of claim 27 wherein collecting the low specific gravity portion comprises overflowing the low specific gravity portion at the first weir disposed to receive an overflow stream from the primary separation container.

35. The process of claim 34 wherein collecting the low specific gravity portion comprises receiving the low specific gravity portion overflowing the first weir in a catchment located behind the weir and directing the collected low specific gravity portion to the secondary separation container.

36. The process of claim 35 wherein directing the collected low specific gravity portion to the secondary separation container comprises causing the collected low specific gravity portion to flow through a conduit extending between the catchment and the secondary separation container.

37. The process of claim 35 wherein receiving the low specific gravity portion at the first weir comprises receiving the low specific gravity portion at a weir having a J-shaped cross section.

38. The process of claim 34 wherein receiving the low specific gravity portion at the first weir comprises receiving the low specific gravity portion at a serpentine weir.

39. The process of claim 27 wherein collecting the low specific gravity portion comprises collecting the low specific gravity portion from a first area of the upper surface of the accumulated feedstock and further comprising overflowing feedstock from a second area of the upper surface from which a substantial portion of the low specific gravity portion has been collected to produce a second discharge stream at a second outlet of the treatment vessel.

40. The process of claim 39 wherein overflowing feedstock from the second area of the upper surface comprises causing the feedstock to overflow into a first launder box, the second outlet being located at a low point in the first launder box.

41. The process of claim 39 wherein producing the second discharge stream comprises producing a second discharge stream comprising at least water and a fine solids component.

42. The process of claim 27 wherein producing the first discharge stream comprises producing a discharge stream comprising at least water and a coarse solids component.

43. The process of claim 42 wherein producing the first discharge stream comprises producing a discharge stream comprising asphaltenes.

44. The process of claim 27 further comprising producing a third discharge stream at a third outlet of the treatment vessel, the third outlet being located at a low point of the secondary separation container.

45. The process of claim 44 wherein producing the third discharge stream at the third outlet comprises causing aqueous components to be collected in a water boot disposed below the secondary separation container, the water boot having an outlet for discharging the third discharge stream.

46. The process of claim 27 wherein collecting the hydrocarbon products from the upper surface of the accumulated low specific gravity portion comprises overflowing the accumulated low specific gravity portion.

47. The process of claim 46 wherein overflowing the accumulated low specific gravity portion comprises causing the hydrocarbon products in the low specific gravity portion of the feedstock to overflow into a second launder box, the product outlet being located at a low point in the second launder box.

48. The process of claim 27 wherein the feedstock comprises an added diluent, and wherein collecting the hydrocarbon products comprises collecting a hydrocarbon product portion and a diluent portion.

49. The process of claim 48 wherein the added diluent comprises one of:
   a paraffinic diluent; and
   a naphthenic diluent.

50. The process of claim 48 wherein the feedstock comprises at least about 60% diluent.

51. The process of claim 27 wherein the treatment vessel comprises a pressure containment vessel and further comprising causing gaseous products released from the feedstock during treatment to be discharged from the treatment vessel through at least one gas outlet.

52. The process of claim 51 further comprising regulating an operating pressure in the treatment vessel.

53. The process of claim 52 wherein regulating the operating pressure comprises:
   causing said at least one gas outlet to be activated to release gaseous products when the operating pressure in the treatment vessel is above a pre-determined maximum operating pressure; and
   introducing a supplementary pressurizing gas when the operating pressure in the treatment vessel falls below a pre-determined minimum operating pressure.

54. An apparatus for treating a heavy hydrocarbon feedstock having a specific gravity differential between components of the feedstock, the apparatus comprising:
   means for receiving the feedstock at an inlet of a treatment vessel;
   means for accumulating feedstock in a primary separation container in the treatment vessel to cause a low specific gravity portion of the feedstock to separate and rise to an upper surface of the accumulated feedstock;
   means for collecting the low specific gravity portion from the surface of the accumulated feedstock in the primary separation container;
   means for directing settling solids in the accumulated feedstock toward a first outlet of the treatment vessel to produce a first discharge stream at the first outlet;
   means for accumulating the collected low specific gravity portion in a secondary separation container in the treatment vessel to cause hydrocarbon products to separate and rise to an upper surface of the accumulated low specific gravity portion; and
   means for collecting the hydrocarbon products from the upper surface of the accumulated low specific gravity portion to produce a hydrocarbon product stream at a product outlet.

* * * * *

UNITED STATES PATENT AND TRADEMARK OFFICE
CERTIFICATE OF CORRECTION

PATENT NO. : 8,168,071 B2  
APPLICATION NO. : 12/277261  
DATED : May 1, 2012  
INVENTOR(S) : Thomas Charles Hann Page 1 of 1

It is certified that error appears in the above-identified patent and that said Letters Patent is hereby corrected as shown below:

At the Title Page of the Patent, at Item (30) Foreign Application Priority Data, at the line before:

"Nov. 7, 2008 (CA) 2643472,"

insert:

--Nov. 9, 2005 (CA) 2526336--.

In column 8 at line 7 Change "napthatenic" to --naphthenic--.

Signed and Sealed this
Fifth Day of March, 2013

Teresa Stanek Rea
*Acting Director of the United States Patent and Trademark Office*